US008666881B2

(12) United States Patent
Lem

(10) Patent No.: US 8,666,881 B2
(45) Date of Patent: Mar. 4, 2014

(54) LOAN MANAGEMENT SYSTEM AND METHOD

(76) Inventor: Jonathan Lem, Elk Grove, CA (US)

( * ) Notice: Subject to any disclaimer, the term of this patent is extended or adjusted under 35 U.S.C. 154(b) by 99 days.

(21) Appl. No.: 13/040,017

(22) Filed: Mar. 3, 2011

(65) Prior Publication Data

US 2011/0258096 A1    Oct. 20, 2011

(51) Int. Cl.
*G06Q 40/00*    (2012.01)
(52) U.S. Cl.
USPC ............................................. 705/38; 705/35
(58) Field of Classification Search
USPC ....................................................... 705/38, 35
See application file for complete search history.

(56) References Cited

U.S. PATENT DOCUMENTS

| | | | | |
|---|---|---|---|---|
| 6,006,207 A | * | 12/1999 | Mumick et al. | 705/38 |
| 6,269,347 B1 | * | 7/2001 | Berger | 705/38 |
| 2003/0023535 A1 | * | 1/2003 | Hoffman | 705/36 |
| 2009/0076948 A1 | * | 3/2009 | Dickerson | 705/38 |

OTHER PUBLICATIONS

Knauer, Thorsten; Sommer, Friedrich; "Interest barrier rules as a response to highly leveraged transactions"; Review of Accounting & Finance; 2012.*
Kaiser, Mark J; Snyder, Brian F. "Modeling offshore wind installation vessel day-rates in the United States"; Maritime Economics & Logistics, Jun. 2012.*

* cited by examiner

*Primary Examiner* — Edward Chang
(74) *Attorney, Agent, or Firm* — James A. Italia; Italia IP

(57) ABSTRACT

A loan management system and method includes an alternative repayment amortization method. Each installment on repayment of the loan includes an equal fixed principal repayment amount and an interest amount. The equal fixed principal repayment amount is based on the amount of the loan and the number of installments to be paid over the life of the loan. The interest due for each installment is based on the interest rate and the amount of outstanding principal at the time a given installment is due.

7 Claims, 2 Drawing Sheets

LOAN MANAGEMENT SYSTEM AND METHOD

BACKGROUND OF INVENTION

This application relates generally to loan management, and, in particular, loan management including an alternative repayment amortization method.

SUMMARY

Debt is commonly used by individuals and business consumers to purchase material goods such as real estate or automobiles in which the consumer does not have or does not choose to purchase the goods in full with available cash.

A common form of debt are loans which are repaid by the borrower to the lender based on agreed upon terms that typically include the amount borrowed, interest rate, term length, and when payments are to be made but may also include other negotiated items. These loans are typically paid with equal fixed payments with a schedule of when payments are to be made and the portion of each payment that applies to repayment of principal and payment of interest. Based on this type of amortization, most of the payments will be applied to interest during the early part of the loan and very little will pay off the principal. In contrast, the payments towards the end of the loan will be applied mostly to principal and very little will be applied to interest. As the payments progress, the portion that applies to payment of principal gradually increases while the portion that applies to interest gradually decreases even though the payment amounts remain the same. It would be desirable to provide a loan management system and/or loan product that provides a more even payment of the principal and gradually declining interest payment over the life of the loan, which results in an overall gradual decline of installment payments. Such a loan management system and product are provided herein.

In one embodiment, a computer implemented method of loan management, comprises: determining a principal loan amount; determining an interest rate; determining a number of repayment installments; calculating a equal fixed principal repayment amount based on the principal loan amount and the number of repayment installments; calculating an interest payment based on the principal, the interest rate and number of repayment installments; calculating an installment amount by adding the equal fixed principal repayment amount and interest payment; calculating a remaining principal amount by subtracting the fixed principle repayment amount from the principal loan amount; calculating a subsequent interest payment based on the remaining principal amount, the interest rate and number of repayment installments; and calculating a subsequent installment amount by adding the equal fixed principal repayment amount and the subsequent interest payment.

In an alternative embodiment, a loan management device comprises: a memory configured to store a set of instructions; and a processor configured to execute the set of instructions, wherein the set of instructions cause the processor to: receive a principal loan amount; receive an interest rate; receive a number of repayment installments; calculate a equal fixed principal repayment amount based on the principal loan amount and the number of repayment installments; calculate an interest payment based on the principal, the interest rate and number of repayment installments; calculate an installment amount by adding the equal fixed principal repayment amount and interest payment; calculate a remaining principal amount by subtracting the fixed principle repayment amount from the principal loan amount; calculate a subsequent interest payment based on the remaining principal amount, the interest rate and number of repayment installments; and calculate a subsequent installment amount by adding the equal fixed principal repayment amount and the subsequent interest payment.

In another embodiment, a loan management system comprising: one or more terminals operable to act as a client on a network; a computer operable to act as a server on the network and to communicate with each of the participant terminals over the network, the computer comprising: a memory configured to store a set of instructions; and a processor configured to execute the set of instructions, wherein the set of instructions cause the processor to: receive a principal loan amount from at least one terminal; receive an interest rate from at least one terminal; receive a number of repayment installments from at least one terminal; calculate a equal fixed principal repayment amount based on the principal loan amount and the number of repayment installments; calculate an interest payment based on the principal, the interest rate and number of repayment installments; calculate an installment amount by adding the equal fixed principal repayment amount and interest payment; calculate a remaining principal amount by subtracting the fixed principle repayment amount from the principal loan amount; calculate a subsequent interest payment based on the remaining principal amount, the interest rate and number of repayment installments; and calculate a subsequent installment amount by adding the equal fixed principal repayment amount and the subsequent interest payment.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
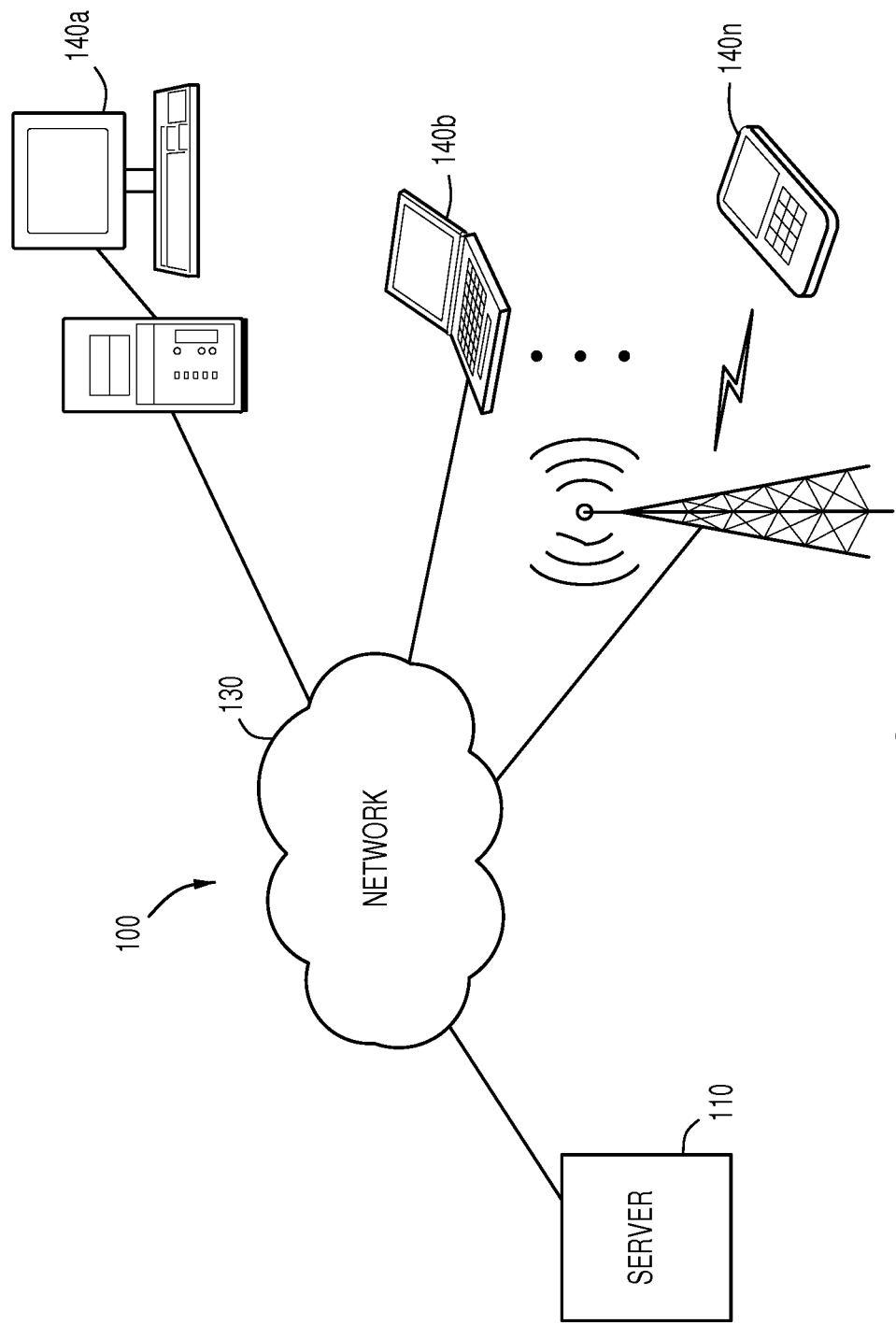
FIG. 1 is an illustration of a loan management network of a first embodiment of the loan management system disclosed herein.

Referring now to FIG. 1, a loan management system 100 is depicted. The system 100 may include a server 110, a communications network 130, and one or more participant terminals 140a-140n (collectively 140). The different elements and components of the system 100 may communicate with one another using wireless communications or hardwired connections, such as fiber optics, cable, DSL, telephone lines, and other similar connections.

The communications network 130 may include any number of networks capable of providing communications between the server 110, and terminals 140. For example, the communications network may be one or more, or any combination of, wireless networks, data or packet networks, publicly switched telephone networks (PSTN), etc.

The participant terminals 140 may include any suitable device operable to act as a client on a network. Illustrative terminals 140 include, but are not limited to, personal computers, desktop computers, laptop computers, servers, or any suitable telecommunications device, including, but not limited to, VoIP telephones, smart telephones or wireless devices, such as cellular telephones, personal digital assistants (PDA), communications enabled mp3 players, etc. Each terminal 140 may be configured to transmit and/or receive information to and/or from the server 110 and/or other participant terminals 140.

The server 110 may be any server, computer or device configured to process commands from the participant terminals 140. For example, the server 110 may be operable to receive loan information or loan installment payment information from one or more terminals 140. In one embodiment, the server 110 may receive information related to the principal loan amount, the loan interest rate, the number of repayment installments, the type of loan, lender information, borrower information, fund transfer information, bank or account information, or any other suitable loan related information. As will be discussed further below, once the server 110 has received all of the relevant loan information, the server may calculate, receive and process payment information. In one embodiment, the principal is paid in equal installments over the life of the loan (i.e., equal fixed principal repayment amount) and the interest payment for each installment is based on the principal remaining when a given installment is due, whereby the total installment amount is the equal fixed principal repayment amount plus the interest payment. An illustrative flow-chart and an example will be discussed in detail below.

In the illustrative embodiment, the server 110 includes a memory and a processor to accommodate the forgoing. However, it will be appreciated that the forgoing may be implemented in hardware, software, or a suitable combination of hardware and software, and which can be one or more software systems operating on a general purpose server platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application. Alternatively, the functions of the server may be performed by a human user.

Figure 2:
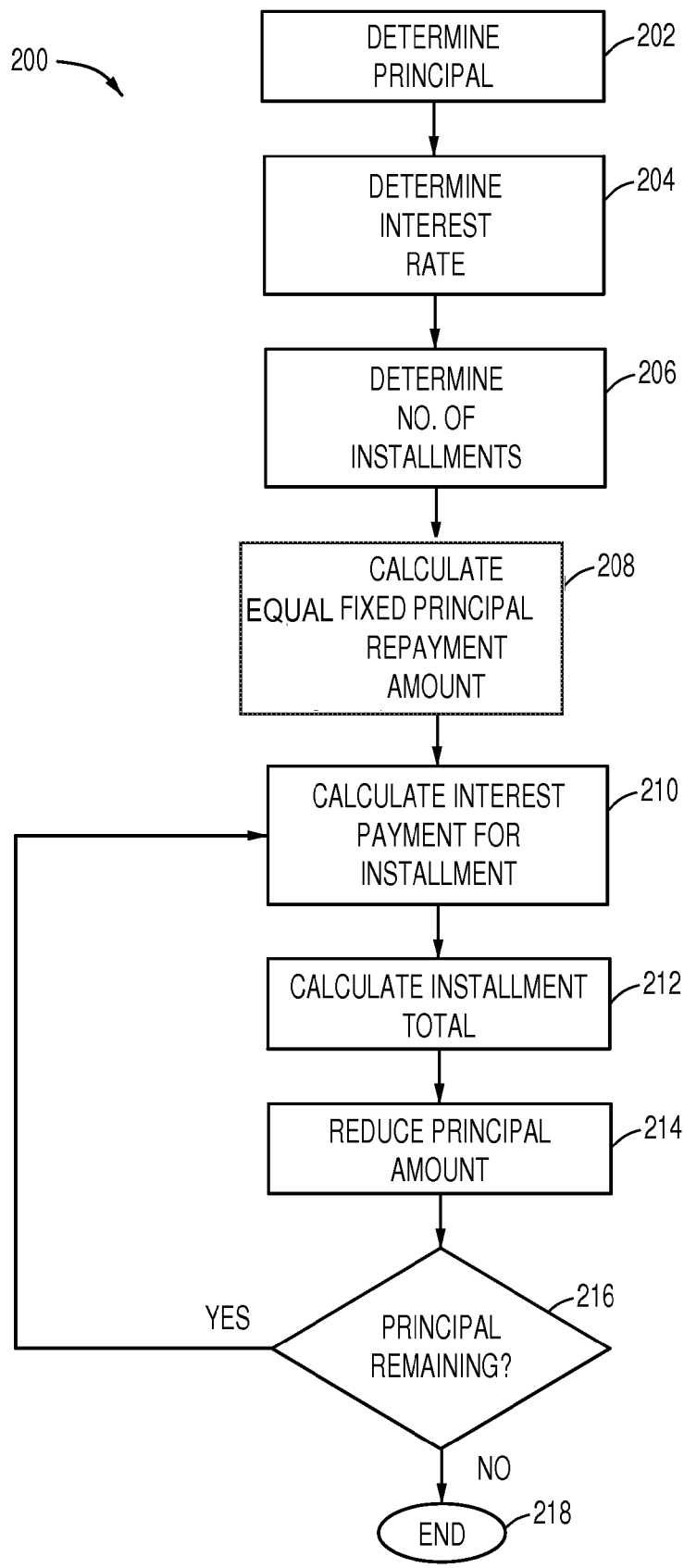
FIG. 2 is a flow diagram of an illustrative process for loan management.

Referring now to FIG. 2, a flowchart 200 of a method of managing a loan is shown. The method may be implemented by a server, wireless device, VoIP telephone, other advanced intelligence network device, or any combination thereof, generally referred to herein as the "device." Alternatively, the method may be performed by a human user.

First, a principal amount for the loan is determined 202. This amount is typically based on how much the borrower would like to borrow as well as how much the lender is willing to lend. The loan may be secured, partially secured or unsecured or have any other suitable configuration. Next, an interest rate is determined 204. The amount of interest is typically based on government regulations as well as the risk tolerance of the lender and the amount of interest a borrower is willing to pay. Alternative methods for determining suitable interest rates are expressly contemplated herein and are considered within the scope of the present disclosure. The length of the loan and number of installments may then be determined 206. The length of the loan and number of installments may be any suitable arrangement and is not limited to any example or express reference to any arrangement disclosed herein. In a non-limiting example of a loan, the principal is $100,000, the interest rate is 8.0%, and the number of installments is 360 (e.g., 30 year loan with monthly installments).

The equal fixed principal repayment amount 208 may then be calculated. This is typically calculated by dividing the principal by the number of installments. In the illustrative example, the equal fixed principal repayment amount is $277.78 ($100,000 divided by 360 installments). This amount is fixed and is paid with each installment. The interest for the given installment may then be calculated 210. This is typically calculated by multiplying the outstanding principal by the interest rate prorated based on the installment frequency. In the illustrative example, the interest paid for the first installment would be $666.67 (i.e., $100,000×(8.0%/12 mos.)=$666.67). As will be appreciated, as the principal outstanding is reduced by the fixed amount after every installment, the interest paid with each subsequent installment will be lesser than each prior interest amount paid. The total installment amount may then be calculated by adding the equal fixed principal repayment amount with the interest payment for the installment 212. In the illustrative example, the total for the first installment would be $944.44 (i.e., $277.78+$666.67=$944.44). The installment may be paid via any suitable means, including, but not limited to, electronic funds transfer, cash payment, check payment or any other suitable payment means. The principal remaining, or remaining principal amount, may then be calculated by subtracting the fixed principal payment from the installment from the outstanding principal 214. In the illustrative example, the outstanding principal after the payment of the first installment would be $99,722.22 (i.e., $100,000−$277.78=$99,722.22). In one embodiment, additional principal can be repaid by the borrower at any time during the loan. This would further reduce the outstanding principal balance owed to the lender thereby reducing subsequent interest payment amounts for the remainder of the loan term.

If outstanding principal remains after the most recent installment 216, subsequent installments may be calculated as described above. A calculation of the second installment per the forgoing example will be described. The equal fixed principal repayment amount remains $277.78. The interest is calculated based on the interest rate, 8.0%, and the principal outstanding after the most recent installment, $99,722.22. For the second installment, the interest payment would be $664.81 (i.e., $99,722.22×(8.0%/12 mos.)=$664.81). Therefore, the total amount for the second installment would be $942.59 (i.e, $277.78+$664.81=$942.59). This process may be repeated until the entire principal has been repaid 218.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A computer implemented method of loan management, comprising:
    determining a principal loan amount and entering the determined principal loan amount into a computer;
    determining an interest rate and entering the determined interest rate into the computer;
    determining a number of repayment current payments due to user and entering the determined number of repayment current payments due to user into the computer;
    causing the computer to calculate a fixed principal repayment amount based on the principal loan amount and the number of repayment current payments due to user;

causing the computer to calculate an interest payment based on the principal, the interest rate and number of repayment current payments due to user;

causing the computer to calculate an installment amount by adding the fixed principal repayment amount and interest payment;

causing the computer to calculate a remaining principal amount by subtracting the fixed principle repayment amount from the principal loan amount;

causing the computer to calculate a subsequent interest payment based on the remaining principal amount, the interest rate and number of repayment current payments due to user wherein the principal payment remains constant throughout all of the repayment current payments due to user and the interest payment declines with succeeding repayment current payments due to user as the principal is paid by each prior repayment current payments due to user, such that the repayment current payments due to user decline with each payment of a prior repayment current payment due to user; and causing the computer to calculate a subsequent current payment due to user amount by adding the fixed principal repayment amount and the subsequent interest payment which is decreased from the prior interest payment as principal is paid with each repayment current payment due to user.

2. The method of claim 1 wherein the number of repayment current payments due to user is determined by multiplying the number of years for the loan by 12.

3. The method of claim 1 wherein the number of repayment current payments due to user is determined by multiplying the number of years for the loan by 4.

4. The method of claim 1 wherein the number of repayment current payments due to user is determined by multiplying the number of years for the loan by 2.

5. The method of claim 1 wherein the loan is a business loan.

6. The method of claim 1 wherein the loan is an automotive loan.

7. The method of claim 1 wherein the loan is a mortgage.

* * * * *